United States Patent [19]

Prine

[11] 3,708,665
[45] Jan. 2, 1973

[54] METHOD AND COMPOSITION FOR NON-DESTRUCTIVE ANALYSIS USING RED LASER BEAMS

[75] Inventor: David W. Prine, Maywood, Ill.

[73] Assignee: Magnaflux Corporation, Chicago, Ill.

[22] Filed: May 3, 1971

[21] Appl. No.: 139,766

[52] U.S. Cl............................250/71 T, 252/301.2 R
[51] Int. Cl..............................................G01n 21/16
[58] Field of Search.....250/71 T, 71 R; 252/301.2 R; 313/108 A, 109

[56] References Cited

UNITED STATES PATENTS 3,117,227  1/1964  Pollack ..............................250/71 T
3,231,738  1/1966  Fischer ..............................250/71 T
3,499,148  3/1970  Nestler et al........................250/71 T
3,549,263  12/1970  Osawa et al. .......................356/209

*Primary Examiner*—James W. Lawrence
*Assistant Examiner*—Davis L. Willis
*Attorney*—Hill, Sherman, Meroni, Gross & Simpson

[57] ABSTRACT

Method and compositions for non-destructive analysis employing a flaw-detecting composition having a dye therein which is excitable by red light, using a source of substantially monochromatic red light as the incident radiation to detect the presence of any such composition which has become lodged in or around flaws in the surface of the test piece.

10 Claims, 1 Drawing Figure

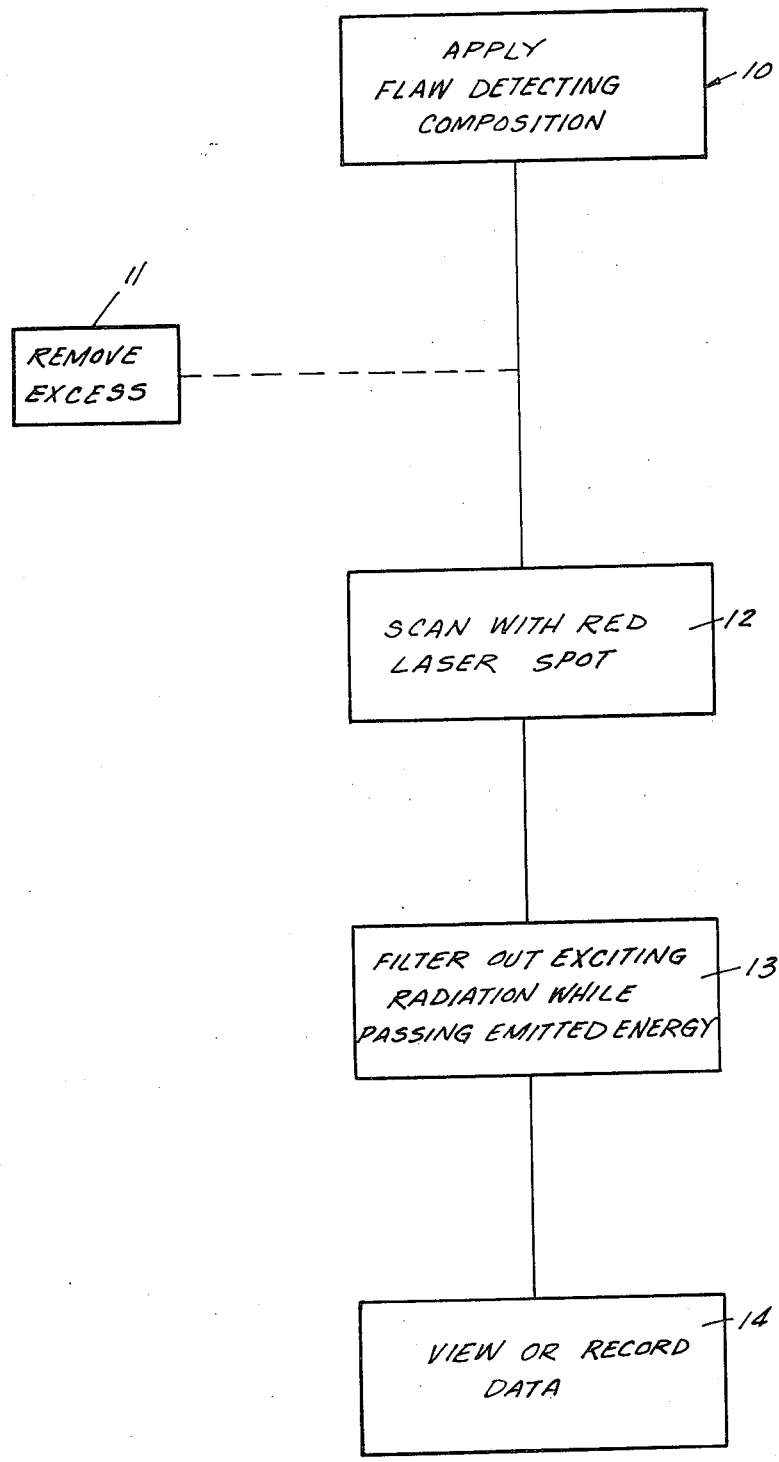

METHOD AND COMPOSITION FOR NON-DESTRUCTIVE ANALYSIS USING RED LASER BEAMS

BACKGROUND OF THE INVENTION

1. Field of the Invention

This invention is in the field of non-destructive testing of objects utilizing either the dyed penetrant inspection process or the fluorescent coated magnetic particle type of inspection technique, wherein an indicator dye sensitive to red incident light is included either in the penetrant composition or in the coating for the magnetic particles, so that said red dye absorbs the red incident light and fluoresces to produce a radiation in the near infrared range.

2. Description of the Prior Art

Non-destructive testing procedures involving the use of fluorescent agents have been well known and extensively practiced in the past three decades. In the typical dyed penetrant inspection process, a liquid penetrant composition containing a vehicle capable of wetting the surface to be tested and containing a fluorescent dye dissolved therein is applied over the surface of the test piece. The penetrant is permitted to dwell on the piece long enough for penetrant to become entrapped in any surface discontinuities, after which the excess penetrant remaining on the surface is washed off. Exudation of the entrapped penetrant is then permitted to occur, and the test piece is examined to determine the location and extent of any flaw indications, either after exudation or after the application of a suitable developer. The examination is made under ultraviolet or "black" light so that the fluorescence exhibited by the dyed penetrant residue is contrastingly visible against the background.

The fluorescent magnetic particle technique utilizes magnetic particles which have fluorescent material such as fluorescent resin pigment bonded to the surfaces of the particles. Examples of prior art patents showing various coating formulations will be set forth in a succeeding portion of this specification. The process consists in magnetizing the test piece and then applying the fluorescent coated magnetic particles (usually having an iron oxide base) over the magnetized piece. The magnetic particles become lodged in or at the surface flaws and can be detected by the usual inspection under ultraviolet light.

While the foregoing systems have been highly useful and widely used they do require a significant amount of inspection time and to some extent rely for their accuracy upon the visual acuity of the inspector. In more recent times, automatic inspection systems have been designed in which the surface of a part is illuminated while it is being scanned by means of a photoelectric detector. While these systems have been satisfactory for some applications, they have been generally limited to the detection of linear and uniformly directed defects along a linear zone of a geometrically simple test piece.

Further improvements in the art of automatic inspection are described and claimed in co-pending application, Ser. No. 27,741 filed Apr. 13, 1970, in which the applicants are Donald T. O'Connor, Bruce C. Graham and myself. In the systems described in that application, radiant energy is impinged uniformly on a substantial area of the part which may be viewed, while in another form of the invention, the surface is scanned by a small flying spot of radiant energy, with detector means being used to respond to the energy reflected back from the surface. In both arrangements, a source of coherent radiation is used, preferably a laser. The fluorescent dye in the penetrant or the fluorescent coating on the magnetic particles, as the case may be, absorbs this incident monochromatic radiation and emits energy in a different spectral range. Filter means are provided to reject the exciting radiation and to pass the emitted energy from the fluorescent dye.

This co-pending application also describes an arrangement in which signals from a photocell are applied to a television monitor having scanning means synchronized with the movements of the scanning spot. In another form of the invention, signals from a photocell are applied to logic circuitry including registering circuits and pattern recognition circuits, so arranged that indications having a certain orientation or orientations are detected irrespective of their position on the surface of the part.

The systems described in the aforementioned co-pending application are designed essentially to operate with conventional fluorescent materials which fluoresce in the green or green-yellow range upon excitation by ultraviolet or violet light having a wave length of about 3,000 to 4,500 angstroms. The source of the exciting radiation is therefore either an argon ion laser or a helium-cadmium laser. However, the use of such lasers is not as effective as it might be, since such lasers are not completely reliable in emitting a substantially monochromatic beam and furthermore these laser sources are quite expensive.

SUMMARY OF THE INVENTION

The present invention is directed to the use of a laser source of extremely reliable characteristics, namely, a red laser particularly one of the helium neon type which has an output exactly at a wave length of 6328 angstroms, coupled with red sensitive fluorescent dyes in the flaw detecting composition which are capable of absorbing such radiation and re-radiating energy in the near infrared range, that is, between 7,000 and 9,000 angstroms. Not only is the use of this combination more effective and reliable, but the laser generating source is less expensive than the laser source putting out emission in the blue or ultraviolet range.

BRIEF DESCRIPTION OF THE DRAWING

Other objects, features and advantages of the invention will be readily apparent from the following description of certain preferred embodiments thereof, taken in conjunction with the accompanying drawings although variations and modifications may be effected without departing from the spirit and scope of the novel concepts of the disclosure, and in which:

The single FIGURE of the drawings represents a flow chart setting forth the basic steps of inspection with the method and compositions of the present invention.

DESCRIPTION OF THE PREFERRED EMBODIMENTS

In the accompanying drawing, reference numeral 10 indicates the initial step of applying a flaw-detecting composition to the surface of the test piece. In a dyed liquid penetrant type of inspection, the process involves preparing a solution of a fluorescent red dye which can absorb radiation at 6328 angstrom units and re-radiate in the range of 7000 to 9000 angstroms. Radiation at 7000 angstroms is just barely visible while at the upper end, the radiation is well within the invisible infrared range. A particularly preferred dye material for use in connection with this invention is diethylthiacarbodicyanine iodide dissolved in a solvent such as dimethyl sulfoxide. Other materials which can be used are the phthalocyanine dyes with or without metallic constituents. In these dyes, the structural unit consists of four isoindole groups linked by four nitrogen atoms to form a conjugated chain. In addition to phthalocyanine alone, derivatives such as copper phthalocyanine, chlorinated copper phthalocyanine in which 14 to 16 of the hydrogen atoms are replaced by chlorine atoms, and sulfonated copper phthalocyanine in which two hydrogen atoms are replaced by sulfonic acid groups may also be used. Structural formulas for such phthalocyanine dyes will be found on pages 419 and 420 of the SOCMA Handbook, Part 3 (1965).

Another red sensitive dye which fluoresces in the near infrared range is methylene blue. While this material is not as sensitive s some of the other dyes, it has the advantage of being relatively inexpensive.

The concentration of the dye in the dye penetrant is not critical. Amounts as little as 0.001 percent by weight up to the limit of solubility of the dye in the vehicle can be used but it is generally better practice to use relatively small amounts on the order of 0.005 percent to 0.1 percent by weight for purposes of economy and also because dilute concentrations of fluorescent dyes tend to exhibit higher fluorescent response than more concentrated solutions.

The vehicle used in the dye penetrant inspection process can be any of the commonly used vehicles for this purpose such as kerosene, paraffinic hydrocarbons, and other petroleum distillates, the only requirement being that the vehicle is capable of wetting the surface to which it is applied.

The flaw-detecting composition referred to in step 10 of the drawings can also be a fluorescent coated particle in which the core consists of a paramagnetic or preferably a ferromagnetic material such as iron or a magnetic iron oxide.

Techniques for coating ferromagnetic particles with fluorescent agents have been described thoroughly in the prior art and reference to such prior patents is invited for details of the coating procedure. Switzer U.S. Pat. No. 2,267,999 contains a comprehensive disclosure of such techniques and specific improvements on the techniques will be found in the Switzer et al. U.S. Pat. No. 2,864,771; Kazenas U.S. Pat. No. 2,936,287; Borrows U.S. Pat. No. 3,404,093; Borucki et al. U.S. Pat. No. 3,485,758; and Graham U.S. Pat. No. 3,502,583.

The prior art methods of these patents can be used to formulate the fluorescent coated magnetic particles of the present invention provided a small amount of a fluorescent red dye is incorporated into the resinous or other coating bonded to the magnetic particles. Again, the amount of the dye incorporated is not critical and may range from a trace up to the limit of solubility of the dye in the resin or other coating material, but is preferably on the order of 0.005 to 0.1 percent by weight of the coating.

Returning to the drawing, in the situation where the inspection process makes use of dyed penetrant inspection techniques, the step of applying the flaw detecting material may be followed by a removal step 11 in which any excess of dyed penetrant or residue thereof is removed from the surface of the part by washing, scrubbing, wiping, or other removal techniques, without, however, removing any substantial amount of the entrapped penetrant residue.

With the dyed penetrant residue or the fluorescent magnetic particles indicating the locus of any surface flaws therein, the piece is ready for inspection in an inspection step 12 where the surface of the piece is scanned with a red laser spot. In exciting the dyes herein described, the cheap but reliable helium-neon laser may be satisfactorily used in the laser flying spot scanner. Such scanning may take place, for example, with the system described in the aforementioned copending application Ser. No. 27,741. As described in that application, the laser beam impinges the surface of the test piece as a very small scanning spot, the spot being deflected in one direction through the operation of an ultrasonic beam deflector and being deflected in the transverse direction through rotation of the piece being scanned. As the impinging laser beam strikes the surface, it is reflected from those portions of the surface in which no fluorescent dyes appears, but is absorbed and re-radiated in the near infrared range by the occlusions of the red fluorescent material in the flaw indicating composition. To distinguish between the reflected exciting radiation and the energy emitted by the fluorescent dye, there is a filtering step, generally indicated at reference numeral 13 of the drawings, which passes the emitted energy from the fluorescent dye but blocks the reflected energy from the surface of the piece.

The final operating step is a viewing or recording step 14 in which the energy passing through the filter is analyzed and reproduced for viewing or recording purposes. This can be done through the medium of photocells positioned to receive the energy passing through the filter and operating to produce an electrical signal. Such signals can be amplified and applied to the control grid or cathode of a cathode ray tube. Horizontal deflection of the cathode ray beam as well as vertical deflection are synchronized through suitable timing means which also control the movement of the test piece and the impingement of the laser beam on the surface of the piece.

Tests were made to determine the relative brightness of infrared fluorescents using a helium-neon laser and a flying spot scanner, with a silicon photodiode for the detector, the latter being equipped with a 7000 angstrom cutoff, long wave pass filter. The targets employed were 0.010 inch diameter strings soaked in the various dye solutions.

It was determined that methylene blue, at a 1 percent concentration of water provided some fluorescence in the 7000 to 9000 angstrom unit range although quite weak. The strongest fluorescence of all was exhibited by a 0.005 percent solution of 3,3' diethylthiacarbodicyanine iodide dissolved in dimethyl sulfoxide. The brightness peak for this material occurred at a concentration of about 0.05 percent by weight, making it attractive commercially even though the cost of the pure material is relatively high.

In the same tests, phthalocyanide was dissolved in a concentration of 0.005 percent in alpha bromonaphthalene. This material exhibited fluorescent brightness which was usable although it was less than one-tenth as bright as the 3,3' diethylthiacarbodicyanine iodide.

A 0.005 solution of chloroaluminum phthalocyanine in dimethyl sulfoxide, when tested under these conditions, exhibited usable fluorescent brightness although substantially less than the preferred material. Similarly, a 0.005 percent solution of magnesium phthalocyanine and dimethyl sulfoxide also provided significant radiation in the 7000 to 9000 angstrom unit range under these conditions. A 0.005 percent solution of dilithium phthalocyanine in dimethyl sulfoxide gave strong fluorescence, about one-third as bright as the 3,3' diethylthiacarbodicyanine iodide.

I claim as my invention:

1. The method of inspecting a test piece for surface flaws which comprises applying to said surface a flaw-detecting composition having a dye therein which is excitable by red light and thereafter impinging on said surface substantially monochromatic red light that causes said dye to emit radiation in the near infrared range and thereby reveal the presence and location of any surface flaw.

2. The method of claim 1 in which said source is a helium-neon laser.

3. The method of claim 1 in which said dye is a fluorescent dye having the property of absorbing red light and emitting radiation in the range from 7,000 to 9,000 angstroms.

4. The method of claim 1 in which said source of light is in the form of a flying spot of a red laser beam.

5. The method of claim 1 in which said dye is contained in a penetrant composition having the ability to become lodged in said flaws.

6. The method of claim 1 in which said dye is contained in a coating on ferromagnetic particles.

7. The method of claim 1 in which said dye comprises diethylthiacarbodicyanine iodide.

8. The method of claim 7 in which said dye is dissolved in dimethyl sulfoxide.

9. The method of claim 1 in which said dye comprises methylene blue.

10. The method of claim 1 in which said dye comprises a phthalocyanine.

* * * * *